US006100467A

United States Patent [19]

Kroulik

[11] Patent Number: 6,100,467

[45] Date of Patent: Aug. 8, 2000

[54] WATER COOLED KICKLESS ELECTRICAL CABLE

[75] Inventor: Erwin K. Kroulik, Edmore, Mich.

[73] Assignee: Flex-Cable, Inc., Morley, Mich.

[21] Appl. No.: 09/026,084

[22] Filed: Feb. 19, 1998

[51] Int. Cl.[7] .............................. H01B 7/34; H02G 15/22

[52] U.S. Cl. ........................... 174/15.1; 174/15.6; 174/19

[58] Field of Search .................................... 174/74 R, 19, 174/20, 15.6

[56] References Cited

U.S. PATENT DOCUMENTS

| | | | |
|---|---|---|---|
| 3,551,581 | 12/1970 | Goodman | 174/15 |
| 3,601,520 | 8/1971 | Carasso | 174/15 |
| 4,018,976 | 4/1977 | Grove | 174/19 |
| 4,199,653 | 4/1980 | Talley | 174/15 WF |
| 4,442,312 | 4/1984 | Oshkin et al. | 174/15 WF |
| 4,487,990 | 12/1984 | Lane et al. | 174/15 WF |
| 4,855,532 | 8/1989 | Tanabe | 174/15.7 |
| 5,317,804 | 6/1994 | Kasper | 29/860 |
| 5,484,960 | 1/1996 | Langhenry et al. | 174/74 R |
| 5,527,994 | 6/1996 | Kasper | 174/74 R |

*Primary Examiner*—Dean A. Reichard
*Assistant Examiner*—William H Mayo, III
*Attorney, Agent, or Firm*—Taylor & Aust, P.C.

[57] ABSTRACT

A water cooled kickless electrical cable includes a plurality of electrical conductors. A first terminal half includes a first wire pocket hole and a fluid port disposed in fluid communication with the first wire pocket hole. A first crimp tube disposed within and extending from the first wire pocket hole is crimped around one-half of the electrical conductors associated with a first polarity. A second terminal half includes a second wire pocket hole and a fluid port disposed in fluid communication with the second wire pocket hole. The second terminal half is connected with the first terminal half. A second crimp tube disposed within and extending from the second wire pocket hole is crimped around a remaining one-half of the plurality of electrical conductors associated with a second polarity. The second crimp tube is longer than the first crimp tube. A hose is attached to each of the first and second terminal halves and encases each of the electrical conductors, the first crimp tube and the second crimp tube.

17 Claims, 5 Drawing Sheets

WATER COOLED KICKLESS ELECTRICAL CABLE

BACKGROUND OF THE INVENTION

1. Field of the Invention

The present invention relates to electrical cables, and, more particularly, to water cooled kickless electrical cables.

2. Description of the Related Art

Water cooled kickless electrical cables are used to carry electrical power from a source to an electrical load which consumes a high amount of electrical energy. For example, such an electrical cable may be used to carry electrical power to a welding gun used on a welding robot. The cable includes a plurality of multi-strand electrical conductors in the form of wire ropes which are arranged around the longitudinal axis of the cable such that the conductors alternate in polarity. This arrangement of the electrical conductors within the cable has been found to substantially reduce the "kicking" of the cable which occurs when the high electrical load is energized.

Water cooled kickless electrical cables are typically constructed with an electrical terminal at the end thereof consisting of two terminal halves which are respectively attached to one-half of the electrical conductors within the cable. Each terminal half is associated with a different electrical polarity. The attachment between the electrical conductors and associated terminal half must be constructed such that electrical continuity is ensured and undue mechanical forces on the electrical conductors are avoided. For example, it is known to attach each electrical conductor to an electrically conducting bar. Each terminal half is formed with a plurality of slots in an axial end face thereof having a shape which corresponds to that of the bars. The bars are received within these slots and attached to the terminal halves. A problem with this type of arrangement is that the electrical conductors are not supported to any significant extent at the connection location with the bars. Moreover, the electrical conductors must be twisted and otherwise routed such that the conductors are ultimately in the alternating polarity configuration within the cable. The distance between the ends of the electrical conductors and the locations where the conductors are actually arranged in alternating polarity may be appreciable. Since it is desirable to arrange the conductors in the alternating polarity to prevent "kicking" of the cable, it is likewise desirable to minimize the distance between the ends of the electrical conductors which are attached to the terminal halves and the location at which the conductors are disposed in alternating polarity relative to each other.

What is needed in the art is a water cooled kickless electrical cable which minimizes the distance adjacent to the terminals which is necessary to arrange the electrical conductors in alternating polarity relative to each other, and which also reduces mechanical stress on the electrical conductors.

SUMMARY OF THE INVENTION

The present invention provides a water cooled kickless electrical cable with the electrical conductors crossing over to establish an alternating polarity in a shorter distance outside the terminal halves.

The invention comprises, in one form thereof, a water cooled kickless electrical cable, including a plurality of electrical conductors. A first terminal half includes a first wire pocket hole and a fluid port disposed in fluid communication with the first wire pocket hole. A first crimp tube disposed within and extending from the first wire pocket hole is crimped around one-half of the electrical conductors associated with a first polarity. A second terminal half includes a second wire pocket hole and a fluid port disposed in fluid communication with the second wire pocket hole. The second terminal half is connected with the first terminal half. A second crimp tube disposed within and extending from the second wire pocket hole is crimped around a remaining one-half of the plurality of electrical conductors associated with a second polarity. The second crimp tube is longer than the first crimp tube. A hose is attached to each of the first and second terminal halves and encases each of the electrical conductors, the first crimp tube and the second crimp tube.

An advantage of the present invention is that the length required for crossover of the electrical conductors outside of the terminal halves is minimized.

Another advantage is that electrical shorting of the conductors in the crossover areas inhibited.

Yet another advantage is that the electrical conductors are supported in the area adjacent to the terminal halves.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
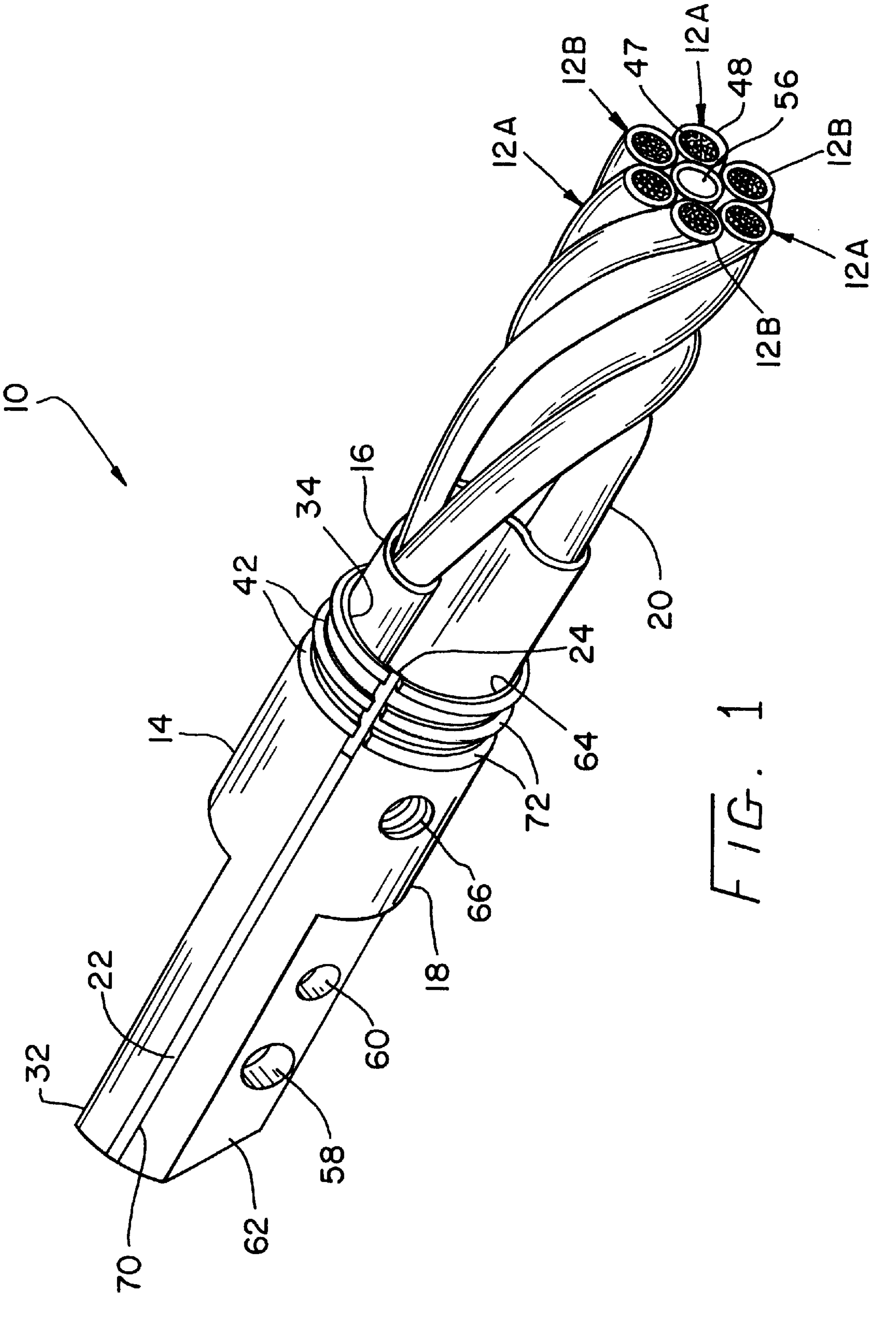
FIG. 1 is a perspective view of one embodiment of a water cooled kickless electrical cable of the present invention.
Figure 2:
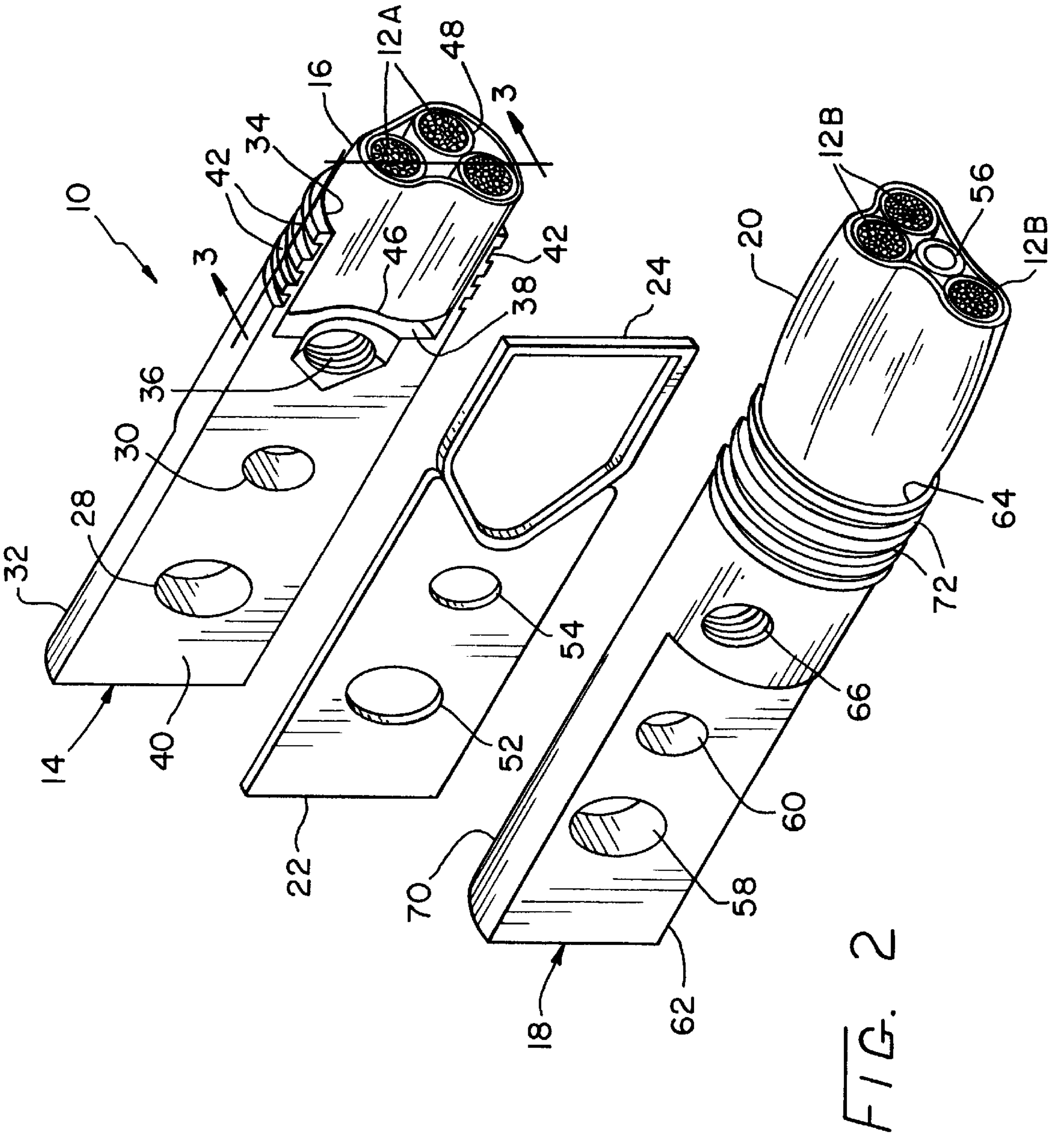
FIG. 2 is an exploded perspective view of the water cooled kickless electrical cable of FIG. 1.
Figure 3:
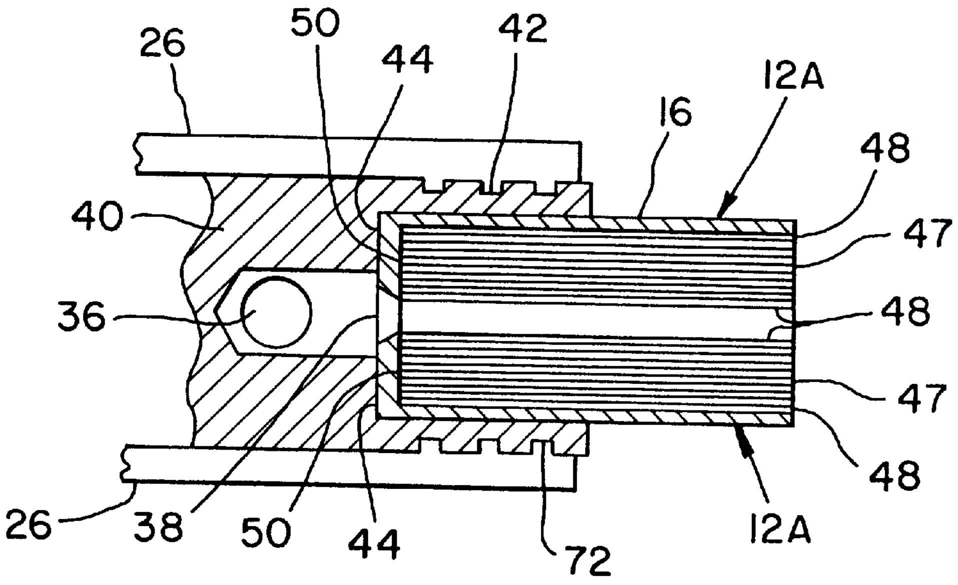
FIG. 3 is a fragmentary, sectional view taken along line 3—3 in FIG. 2.

Referring now to the drawings, and more particularly to FIGS. 1–3, there is shown an embodiment of a water cooled kickless electrical cable 10 of the present invention, including a plurality of electrical conductors 12A and 12B, a first terminal half 14, a first crimp tube 16, a second terminal half 18, a second crimp tube 20, electrically insulating gaskets 22 and 24, and hose 26.

First terminal half 14 includes a first hole 28 and a second hole 30 in a flattened end 32 thereof. First hole 28 allows first terminal half 14 to be connected to a source of electrical power in known manner. Second hole 30 allows first terminal half 14 to be connected to second terminal half 18, as will be described hereinafter. At an end opposite from end 32, first terminal half 14 includes a first wire pocket hole 34 which is generally semi-circular in cross-sectional shape. A fluid port 36 is disposed in fluid communication with first wire pocket hole 34 and is attachable with a source of cooling fluid (not shown). More particularly, in the embodiment shown, fluid port 36 is internally threaded and a threader, male fitting (not shown) is screwed into fluid port 36 and attached to the external source of cooling fluid. First wire pocket hole 34 includes an end wall 38 which, in the embodiment shown, is substantially flat and disposed generally perpendicular to the longitudinal axis of first terminal half 14. First terminal half 14 is provided with a generally flat, inner face 40 which allows first terminal half 14, gaskets 22 and 24 and second terminal half 18 to be bolted or otherwise attached together in a compact manner. A plurality of longitudinally adjacent annular grooves 42 are formed in first terminal half 14 at a location which is radially adjacent to first wire pocket hole 34. Annular grooves 42 grip and provide a fluid tight seal with hose 26. A band or other suitable device (not shown) may be placed around the radially outside periphery of hose 26 to bias hose 26 in a radially inward direction toward annular grooves 42 of first terminal half 14.

First crimp tube 16 is disposed within first wire pocket hole 34, and extends from first wire pocket hole 34 a predetermined distance. In the embodiment shown, first crimp tube 16 has a length of approximately ⅝ inch, and extends from first wire pocket hole 34 approximately ¼ inch. First crimp tube 16 is formed from an electrically conductive material, such as a copper sleeve or other suitable material. First crimp tube or 16 is mechanically and electrically attached to first terminal half 14, such as by a solder joint 44 interconnecting an axial end 46 with end wall 38 of first wire pocket hole 34. Of course, a solder joint may also be used to interconnect the radial periphery of first wire pocket hole 34 with first crimp tube 16.

First crimp tube 16 is crimped around a number of the plurality of electrical conductors 12. More particularly, in the embodiment shown, first crimp tube 16 is crimped around one-half of the plurality of electrical conductors 12A which are associated with a first electrical polarity. Since the embodiment of cable 10 shown in FIGS. 1–3 includes six electrical conductors 12, first crimp tube 16 is therefore disposed around three electrical conductors 12A of a first polarity. First crimp tube 16 is sized with initial dimensions and a shape prior to crimping such that the three electrical conductors 12A may be slid and received therein. After crimping, first crimp tube 16 exerts a radially compressive force on a portion of the periphery of electrical conductors 12A which is sufficient to mechanically hold electrical conductors 12A in place therein.

First crimp tube 16 and second crimp tube 20 are each formed with a slight radially outward projecting flare at the end thereof which is not disposed within respective first terminal half 14 or second terminal half 18. The outward flare provides a slight radius allowing conductors 12A and 12B to be more easily bent relative to first crimp tube 16 and second crimp tube 20, and reduces mechanical stress on conductors 12A and 12B.

Electrical conductors 12A each include an electrically conductive, multi-strand wire rope 47 and an insulating jacket 48. Wire rope 47 may be either twisted or straight. Jacket 48 is formed from a suitable electrically insulating material, such as polytetrafluoroethelyne (PTFE). Jacket 48 extends to an end 50 of a corresponding electrical conductor 12A within first crimp tube 16 (FIG. 3). End 50 of each electrical conductor 12A is electrically and mechanically connected with end wall 38 through solder joint 44. It should be noted that solder joint 44 is shown enlarged in FIG. 3 for purposes of illustration. First crimp tube 16 and ends 50 of electrical conductors 12A may in fact be disposed closer to end wall 38 than shown in FIG. 3. Solder 44 is wicked into position by inserting first crimp tube 16 within first wire pocket hose 34, heating the entire assembly to a specified temperature and wicking solder 44 into place.

Each electrical conductor 12A has a length which is likely much longer than that shown in FIG. 1. Jacket 48 for each electrical conductor 12A covers substantially the entire length thereof. For example, each electrical conductor 12A may be of any specified length and is likely connected to another first terminal half (not shown) at an end of cable 10 which is opposite from first terminal half 14. Jacket 48 for each electrical conductor 12A thus extends from and between opposite terminal halves of cable 10. One terminal half may be connected to the source of electrical power, while the other terminal half may be connected to, e.g., a welding gun or the like. Electrical conductors 12A and 12B are shown with a twisted configuration in FIG. 1 when disposed within hose 26. The twisted configuration allows cable 10 to be bent more easily.

Gaskets 22 and 24 electrically insulate first terminal half 14 from second terminal half 18. In the embodiment shown, gasket 22 is a phenolic gasket, and gasket 24 is a rubber gasket. However, gaskets 22 and 24 may be formed from any suitable electrically insulating material. Gasket 22 includes a first hole 52 and a second hole 54 which respectively align with first hole 28 and second hole 30 of first terminal half 14 when first terminal half 14 is connected with second terminal half 18. It is also possible to replace gasket 22 and gasket 24 with a single gasket formed from a single electrically insulating material.

Second terminal half 18 includes a first hole 58 and a second hole 60 in a flattened end 62 thereof. First hole 58 allows second terminal half 18 to be connected to a source of electrical power in known manner. Second hole 60 allows second terminal half 18 to be connected to first terminal half 14. At an end opposite from end 62, second terminal half 18 includes a second wire pocket hole 64 which is generally semi-circular in cross-sectional shape. A fluid port 66 is disposed in fluid communication with second wire pocket hole 64 and is attachable with a source of cooling fluid (not shown). More particularly, in the embodiment shown, fluid port 66 is internally threaded and a threaded, male fitting (not shown) is screwed into fluid port 66 and attached to the external source of cooling fluid. Second wire pocket hole 64 includes an end wall (not numbered, but similar to end wall 38) which, in the embodiment shown, is substantially flat and disposed generally perpendicular to the longitudinal axis of second terminal half 18. Second terminal half 18 is provided with a generally flat, inner face 70 which allows second terminal half 18, gaskets 22 and 24 and first terminal half 14 to be bolted or otherwise attached together in a compact manner. A plurality of longitudinally adjacent annular grooves 72 are formed in second terminal half 18 at a location which is radially adjacent to second wire pocket hole 64. Annular grooves 72 grip and provide a fluid tight seal with hose 26. A band or other suitable device (not shown) may be placed around the radially outside periphery of hose 26 to bias hose 26 in a radially inward direction toward annular grooves 72 of second terminal half 18.

Second crimp tube 20 is disposed within second wire pocket hole 64, and extends from second wire pocket hole 64 a predetermined distance. In the embodiment shown, second crimp tube 20 has a length of approximately 2½ inches, and extends from second wire pocket hole 64 approximately 2⅛ inches. Second crimp tube 20 is formed from an electrically conductive material, such as a copper sleeve or other suitable material. Second crimp tube 20 is mechanically and electrically attached to second terminal half 18, such as by a solder joint 44 interconnecting an axial end (not numbered, but similar to axial end 46) with end wall 68 of second wire pocket hole 64. Of course, a solder joint may also be used to interconnect the radial periphery of second wire pocket hole 64 with second crimp tube 20.

Second crimp tube 20 is crimped around a number of the plurality of electrical conductors 12. More particularly, in the embodiment shown, second crimp tube 20 is crimped around one-half of the plurality of electrical conductors 12B which are associated with a second electrical polarity. Since the embodiment of cable 10 shown in FIGS. 1–3 includes six electrical conductors 12, second crimp tube 20 is therefore disposed around three electrical conductors 12B of a second polarity. Second crimp tube 20 is sized with initial dimensions and a shape prior to crimping such that the three electrical conductors 12B may be slid and received therein. After crimping, second crimp tube 20 exerts a radially compressive force on a portion of the periphery of electrical conductors 12B which is sufficient to mechanically hold electrical conductors 12B in place therein.

A tube 56 is disposed within second crimp tube 20. After being crimped, second crimp tube 20 is positioned within cable 10 such that tube 56 substantially aligns with the longitudinal axis of cable 10. Tube 56 is formed from a suitable material having a desired stiffness, such as rubber, which is relatively easy to bend. Tube 56 is centrally located between the alternate polarity electrical conductors 12A and 12B, and maintains electrical conductors 12A and 12B in the kickless format shown.

Figure 6:
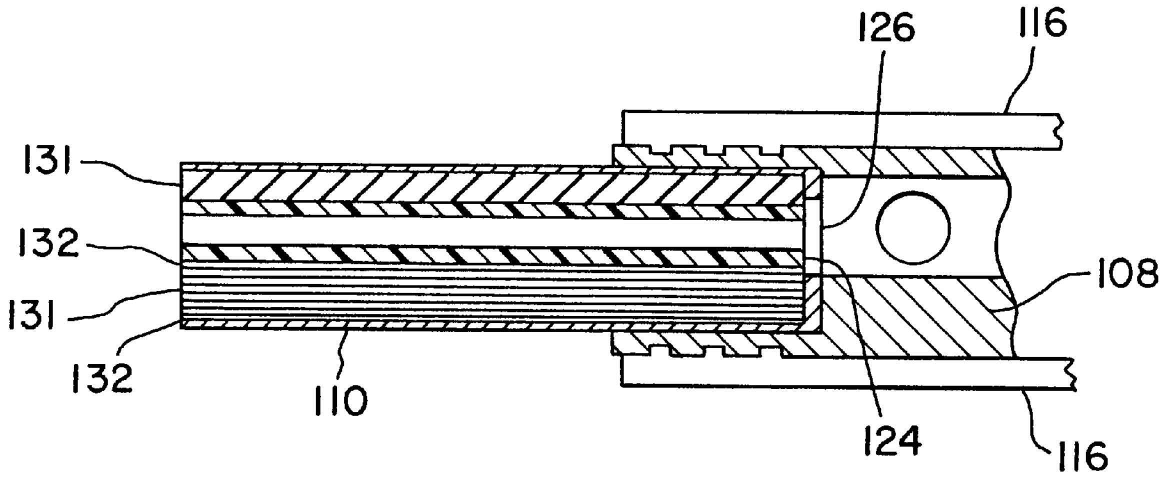
FIG. 6 is a fragmentary, sectional view taken along line 6—6 in FIG. 5.
Figure 4:
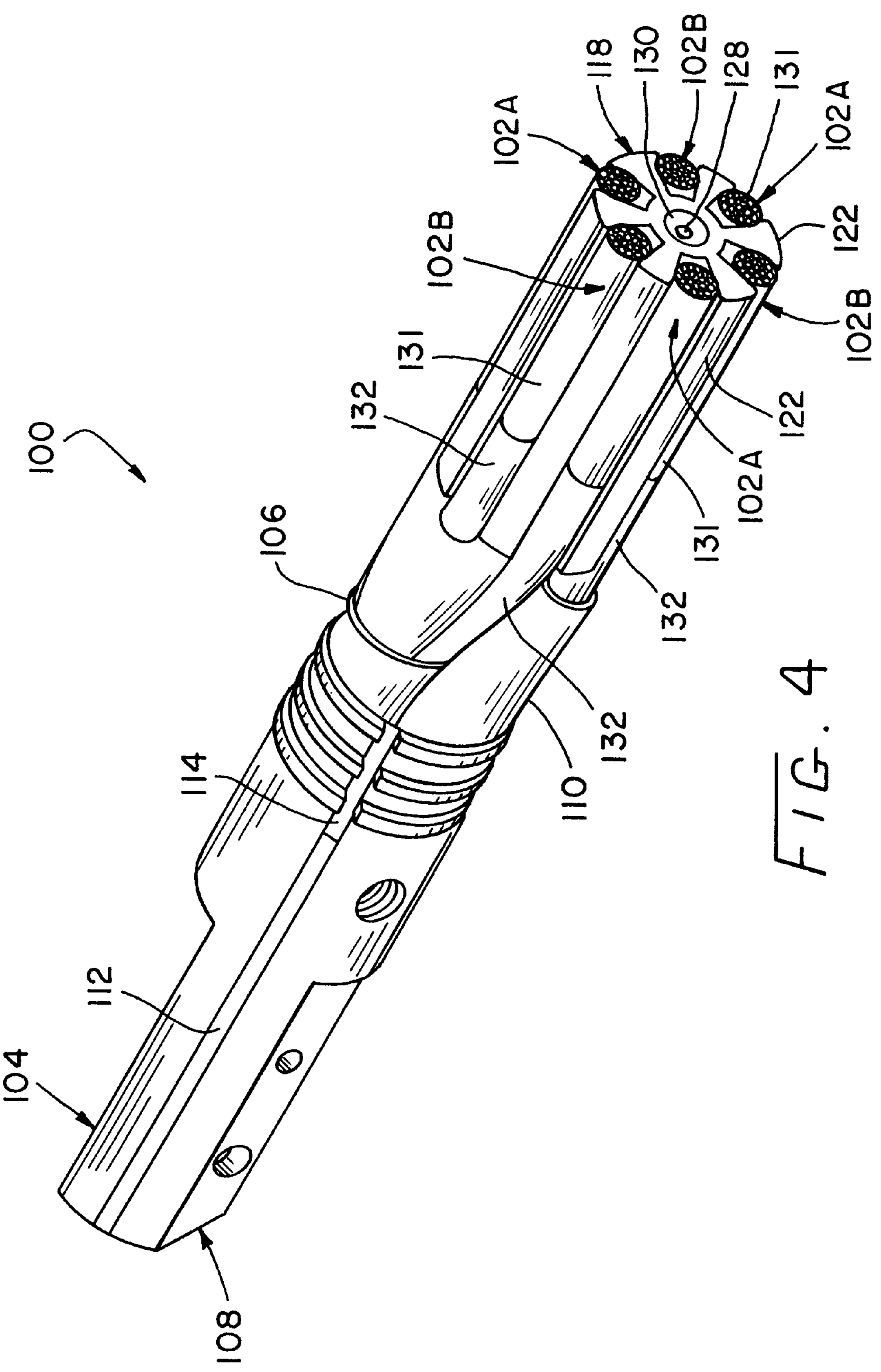
FIG. 4 is a perspective view of another embodiment of a water cooled kickless electrical cable of the present invention.
Figure 5:
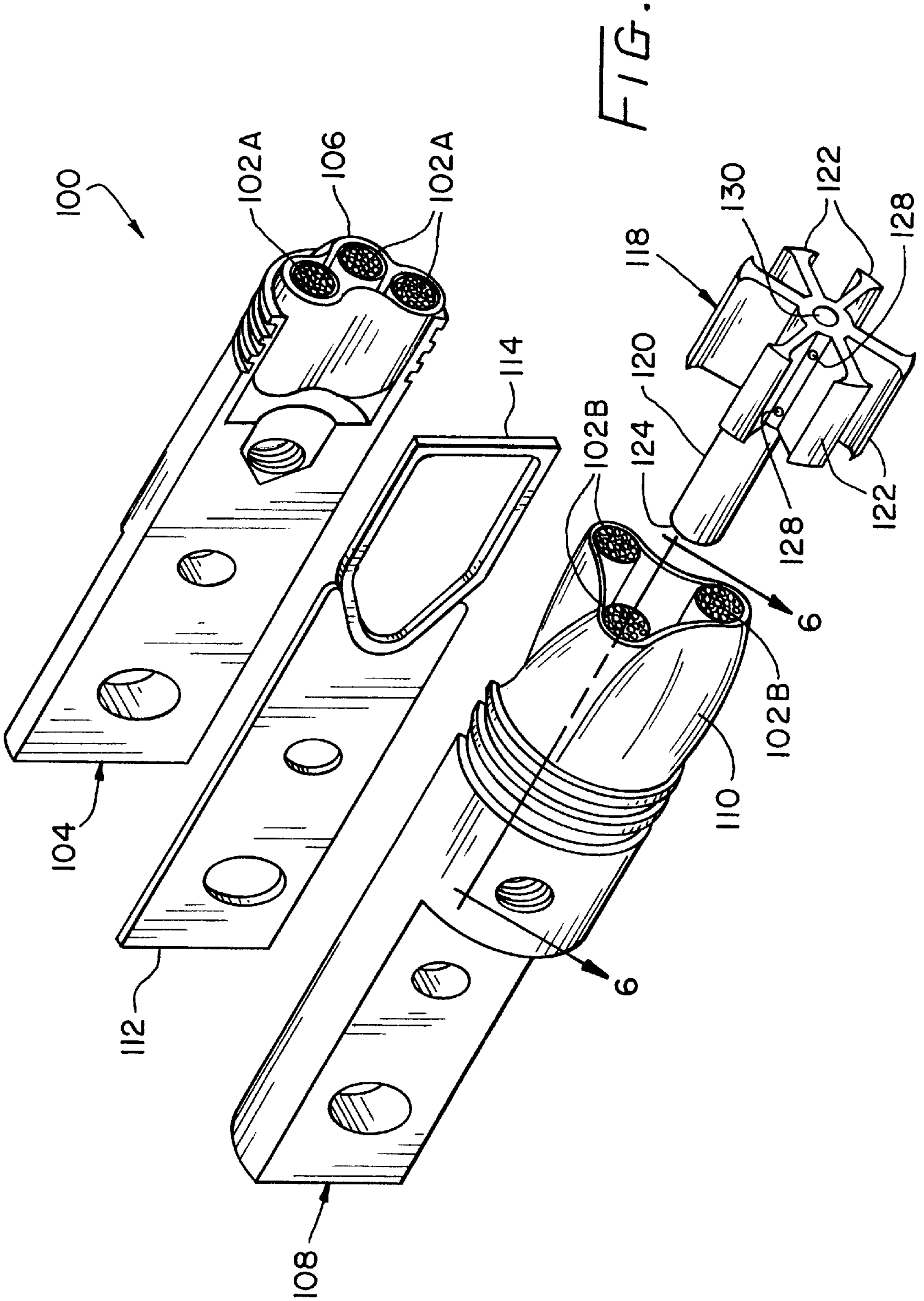
FIG. 5 is an exploded perspective view of the water cooled kickless electrical cable of FIG. 4.

Referring now to FIGS. 4–6, there is shown another embodiment of a water cooled kickless electrical cable 100 of the present invention, including electrical conductors 102A and 102B, first terminal half 104, first crimp tube 106, second terminal half 108, second crimp tube 110, gaskets 112 and 114, and hose 116.

First terminal half 104, second terminal half 108, gaskets 112 and 114, and hose 116 are substantially the same as the correspondingly referenced parts of water cooled kickless electrical cable 10 shown in FIGS. 1–3 and will thus not be described in detail again.

The primary difference between cable 100 shown in FIGS. 4–6 and cable 10 shown in FIGS. 1–3 is that cable 100 includes a star separator 118 which separates electrical conductors 102A and 102B. Star separator 118 has an elongate core 120 and a plurality of arms 122 which extend radially therefrom. Star separator 118 is formed from a co-extrusion process, wherein the plurality of arms 122 are formed from a first material, and core 120 is formed from a second material which is stiffer than the first material from which arms 122 are formed. Forming star separator 118 as such has been found to provide adequate rigidity of cable 10 adjacent to second terminal half 108 while at the same time allowing adequate flexibility of cable 10 away from second terminal half 108.

Core 120 has an end 124 which is disposed within second crimp tube 110 and adjacent to end wall 126. After being crimped around conductors 102B and core 120, or simultaneously therewith, the end of second crimp tube 110 which is opposite from end wall 126 is bent and otherwise positioned such that the longitudinal axis of core 120 substantially corresponds with the longitudinal axis of cable 100.

Star separator 118 may be provided with a plurality of radial openings 128 which extend to a hollow, inner-cavity 130 of core 120. Radial openings 128 assist fluid flow through and thus cooling of cable 100.

Unlike electrical conductors 12A and 12B of cable 10 shown in FIGS. 1–3, electrical conductors 102A and 102B of cable 100 do not include a jacket which extends the entire length thereof. Rather, each electrical conductor 102A and 102B includes a multi-strand wire rope 131 and an electrically insulating jacket 132 which extends from an end thereof adjacent to respective first terminal half 104 and second terminal half 108 to a position slightly past the beginning of arms 122. That is, each electrical conductor 102A and 102B includes a jacket 132 which electrically insulates the conductor until the conductor is disposed within an adjacent pair of arms 122 of separator 118, after which arms 122 provide electrical insulation and the jacket is no longer required. In the embodiment shown in FIG. 4–6, each electrical conductor 102A and 102B includes a jacket 132 which extends from an end thereof within respective first crimp tube 106 or second crimp tube 110 to a position which is approximately one inch past the beginning of the pair of arms 122 between which the particular electrical conductor 102A or 102B is disposed. Jacket 132 associated with each electrical conductor 102A carried within the shorter, first crimp tube 106 is thus electrically insulated from the portion of the longer, second crimp tube 110 lying adjacent thereto.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A water cooled kickless electrical cable, comprising:

a plurality of electrical conductors;

a first terminal half including a first wire pocket hole and a fluid port disposed in fluid communication with said fist wire pocket hole;

a first crimp tube disposed within and extending from said first wire pocket hole, said first crimp tube including at least one crimp portion located around and in mechanically retaining contact with one-half of said plurality of electrical conductors associated with a first polarity;

a second terminal half including a second wire pocket hole and a fluid port disposed in fluid communication with said second wire pocket hole, said second terminal half being connected with said first terminal half; and a second crimp tube disposed within and extending from said second wire pocket hole, said second crimp tube including at least one crimp portion located around and in mechanically retaining contact with a remaining one-half of said plurality of electrical conductors associated with a second polarity, said second crimp tube being longer than said first crimp tube.

2. The water cooled kickless electrical cable of claim 1, further comprising a hose attached to each of said first terminal half and said second terminal half and encasing each of said plurality of electrical conductors, said hose further encasing said first crimp tube and said second crimp tube.

3. The water cooled kickless electrical cable of claim 1, further comprising a separator having an elongate core and a plurality of radially extending arms, each of said plurality of electrical conductors being disposed between a respective adjacent pair of said arms such that adjacent electrical conductors on either side of any one electrical conductor are of a different polarity than said one electrical conductor.

4. The water cooled kickless electrical cable of claim 3, wherein said elongate core has an end which is disposed within said first crimp tube or said second crimp tube.

5. The water cooled kickless electrical cable of claim 4, wherein said end of said elongate core is disposed within said second crimp tube.

6. The water cooled kickless electrical cable of claim 3, wherein each of said plurality of electrical conductors includes an insulating jacket therearound which extends between said respective adjacent pair of arms.

7. The water cooled kickless electrical cable of claim 3, wherein said plurality of radially extending arms of said separator are comprised of a first material, and wherein said core of said separator is comprised of a stiffer, second material.

8. The water cooled kickless electrical cable of claim 3, wherein said separator includes a plurality of radial openings extending through said core.

9. The water cooled kickless electrical cable of claim 1, wherein each of said plurality of electrical conductors includes an insulating jacket therearound.

10. The water cooled kickless electrical cable of claim 9, wherein each of said plurality of electrical conductors has a length, and wherein said insulating jacket for each said electrical conductor covers substantially all of said length.

11. The water cooled kickless electrical cable of claim 9, wherein said insulating jacket for each said electrical conductor has an end which extends into a corresponding end of said first crimp tube and said second crimp tube.

12. The water cooled kickless electrical cable of claim 1, further comprising at least one electrically insulating gasket disposed between said first terminal half and said second terminal half.

13. The water cooled kickless electrical cable of claim 12, wherein said at least one electrically insulating gasket comprises two electrically insulating gaskets.

14. The water cooled kickless electrical cable of claim 1, wherein said one-half of said electrical conductors within said first crimp tube are disposed around a portion of said second crimp tube extending from said second wire pocket hole.

15. The water cooled kickless electrical cable of claim 3, wherein said arms of said separator are formed of a first material, said elongate core of said separator is formed of a second material, said second material being stiffer than said first material, said first material and said second material being joined together to thereby form a unitary separator body.

16. The water cooled kickless electrical cable of claim 1, wherein at least one of said first crimp tube and said second crimp tube includes an end extending beyond a corresponding terminal half, at least one of said at least one end including a radially outward projecting flare having a radius configured for reducing a mechanical stress on said plurality of electrical conductors.

17. The water cooled kickless electrical cable of claim 1, wherein said first crimp tube exerts a first radially-compressive force on at least a portion of a periphery of said one-half of said plurality of electrical conductors crimped therein, and said second crimp tube exerts a second radially-compressive force on at least a portion of a periphery of said one-half of said plurality of electrical conductors crimped therein.

* * * * *